May 25, 1943.  J. A. ROUSCULP  2,320,197
LINE SUPPORT
Filed Oct. 8, 1941
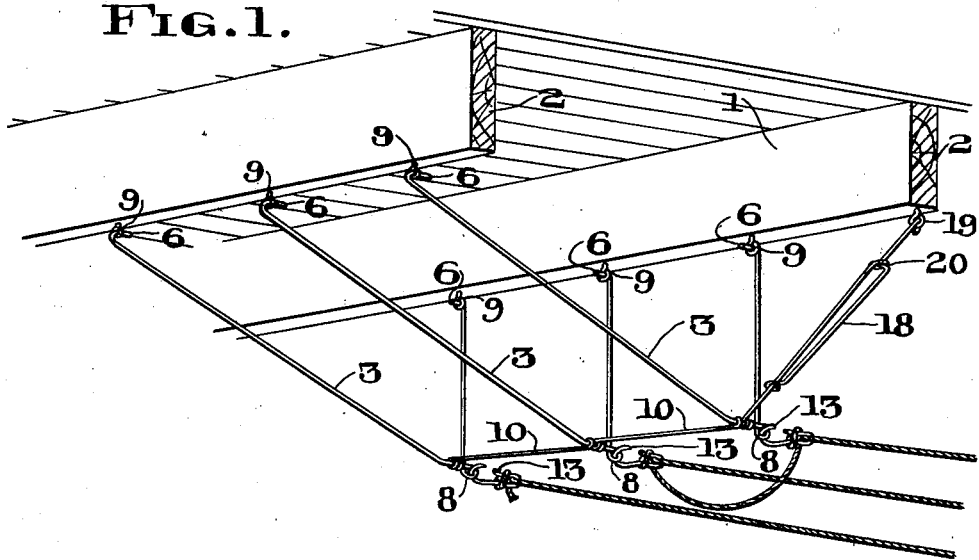
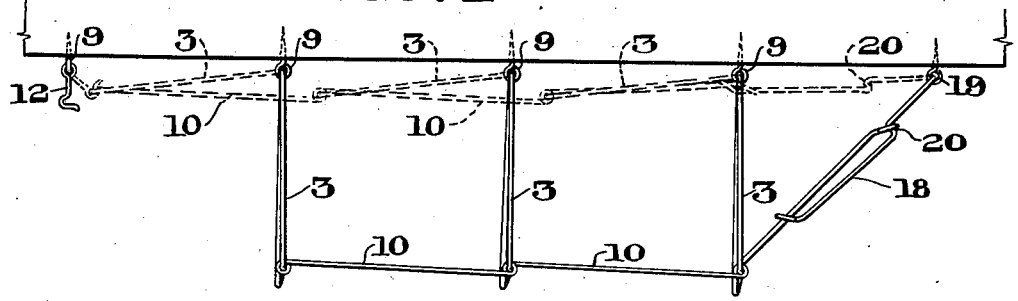
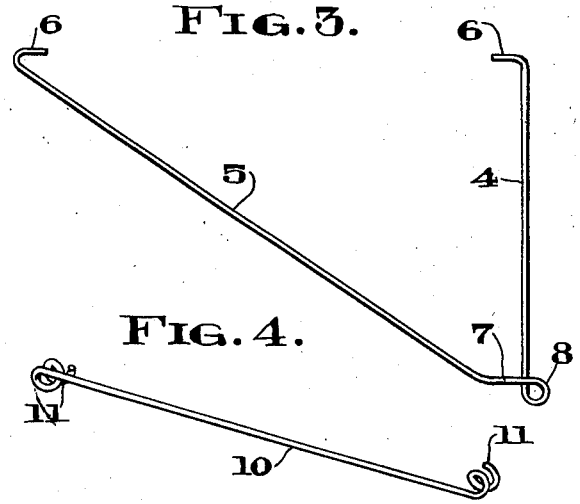
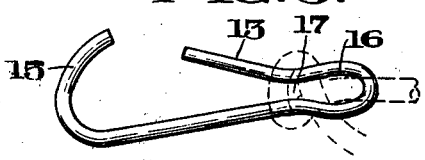
Inventor
JOHN A. ROUSCULP
W. S. McDowell
Attorney Patented May 25, 1943

2,320,197

UNITED STATES PATENT OFFICE 2,320,197

LINE SUPPORT

John A. Rousculp, Columbus, Ohio

Substituted for abandoned application Serial No. 356,970, September 16, 1940. This application October 8, 1941, Serial No. 414,113

7 Claims. (Cl. 211—119.10)

This invention relates generally to line-supporting devices and more particularly to a device for supporting a clothesline within an enclosure such as a basement, attic or the like.

One of the primary objects resides in the provision of a clothesline support which will be inexpensive to manufacture, simple and convenient to operate and one which will securely hold the clothesline without danger of collapse even when the line is fully loaded.

Another object of the invention resides in the provision of a clothesline holder which is formed from a plurality of bent wire sections so assembled and connected to a suitable support as to be capable of being positioned in operative and inoperative positions without requiring the removal of the clothesline therefrom. Thus the line may be maintained fully assembled and stretched, yet occupy an out-of-the-way place during periods of non-use.

A further object rests in providing a plurality of identically shaped bracket members and means for pivotally suspending them from a suitable overhead support, means also being provided to connect adjacent members whereby the relative positions thereof will be maintained during their pivotal movement, the shape of the members and the method of connecting the same to the support being such as to provide a strong mounting for the clothesline which will withstand the heavy loads imposed by the application of wet clothes to the line.

A still further object rests in providing the pivotally mounted bracket members above mentioned with loops for the reception of novel hook members so formed that they may be removed and replaced without requiring the removal of the bracket members. The shape of the hook members permits the clothesline to be attached thereto and adjusted even though the end portions are secured at points located remotely therefrom, this feature being particularly advantageous because each line may be separately adjusted without interfering with the other lines.

Further objects and advantages will be apparent from the following description and the accompanying drawing in which the invention has been disclosed in detail.

In the drawing:

Fig. 1 is a perspective view showing one end of a line supporting mechanism formed in accordance with the present invention, the opposite end not being disclosed because it is a duplicate of the one shown;

Fig. 2 is a front elevational view of the mechanism shown in Fig. 1;

Fig. 3 is a side elevational view of a bracket forming a part of the supporting mechanism;

Fig. 4 is a perspective view of a link employed to transmit motion from one bracket to another;

Fig. 5 is an elevational view of a hook used to connect the line to the support;

Fig. 6 is a similar view of a modified form of hook.

Referring more particularly to the drawing, the numeral 1 designates an overhead framework from which the supporting device is suspended. In this instance, the framework is disclosed as comprising joist members 2 but it is obvious that the supporting device may be suspended from a ceiling or other group of panel members rather than the under surfaces of the joists. The supporting mechanism includes a plurality of bracket members 3, each of which is formed from a length of wire bent into a modified V-formation, one arm 4 of the V being substantially vertical while the arm 5 is inclined. The upper ends of these arms are bent a short distance from the ends of the wire section to provide oppositely directed pivot extensions 6, the extension at the end of the arm 5 being directed toward the other arm, thus forming a hook. The lower end of the arm 5 is joined with a horizontal portion 7, the forward end of which is bent to form a loop or eye 8, the lower end of the arm 4 constituting a continuation of the loop. A plurality of these brackets are employed to make up the line support, the number being determined by the size of the space in which the line is to be supported and the length of the line.

The brackets are arranged in sets, as illustrated in Figs. 1 and 2, these sets being oppositely arranged and located at opposite sides of the area in which the line is to be suspended. To pivotally suspend the brackets from the frame, the latter has a plurality of eye members 9 inserted therein, the eyes being arranged in sets, those of each set being in substantial registration to receive the pivot extensions 6. The lower end portions of the brackets are connected by links 10 of the type shown in Fig. 4 which comprise lengths of wire curled on their ends as at 11 to form spiral eye members, the convolutions of which are slightly spaced in order that the links may be connected with the brackets after the latter have been formed. The spacing of the convolutions also permits those of one link to be positioned between those of the next adjacent link.

By mounting the brackets and links as above described, the brackets will swing about their pivots as a single unit from a substantially vertical position, as shown in full lines in Fig. 2, to a substantially horizontal position adjacent to the under side of the frame, as indicated by dotted lines in the same figure. The under side of the frame is provided with a hook 12 of any suitable type for engagement with one of the brackets when the assembly is in the horizontal position to cause it to be maintained in this position when the line is not in active use. After the brackets have been assembled with the support at each end of the enclosure, the line may be connected therewith through the use of line gripping members 13 or 14 shown in Figs. 6 and 7. Each form of line gripping member includes a piece of wire bent to produce a hook 15 and a line receiving loop 16.

In the form shown in Fig. 5, the loop 16 is in communication with the opening of the hook through a reduced neck 17. When the line is to be connected with the supporting brackets, the gripping members are positioned on the line as illustrated in dotted lines in Fig. 6 and the hook portion 15 then inserted in the eyes 8 of the brackets. If it is desired to further stretch the line, one or more of the gripping members 13 may be removed and the line adjusted thereon, after which the members may be connected with the brackets. It is only necessary to remove one gripping member for each length of line to perform this operation and the adjustment may be made whether the gripping member is connected with the end or an intermediate portion of the line. By providing the reduced neck 17, the gripping member 13 may be positioned on the line and retained even when disconnected from the brackets.

The form of gripping member shown in Fig. 6 does not have the reduced neck between the loop portion and the hook, the sides of the loop in this form being angularly related to grip the line when it is forced into the loop. After the line has been connected with the brackets, it may be permanently retained since the entire assembly may be moved to an out-of-the-way position when not in active use by swinging both sets of brackets upwardly and securing them by the hooks 12. To retain the line assembly in the lowered active position when in use, an extensible brace 18 is connected with the first bracket of each set. The brace 18 includes a pair of sections, one of which is pivoted at one end to the first bracket and the other pivotally connected to the under side of the frame by an eye member 19. The opposite ends of the sections have eyes formed therewith, each eye slidably receiving the other section.

One of the sections is formed intermediate of its length with a shoulder 20 for engagement by the eye of the other section. When this engagement obtains, as illustrated in full lines in Figs. 1 and 2, the brackets will be retained against swinging movement in a direction away from the brace. When the engagement is destroyed, as shown by dotted lines in Fig. 2, the brackets may be swung to their inactive positions. By offsetting the eyes 9 with which the pivot extensions at the end of the inclined arms are engaged with respect to those engaged by the vertical arms, the brackets will have a tendency to swing away from the brace when clothing is suspended from the lines. The braces will prevent this movement and hold the supports in their lowermost positions.

If the distance between the sets of brackets is so great that the load imposed on the lines will cause them to sag, suitable hangers may be employed at any point between the sets of brackets. These hangers will, of course, be pivotally suspended in order that no interference will be offered to the swinging movement of the line assembly.

By directing the pivot extension 6 of the inclined arm toward the vertical arm, the load imposed on the bracket will have no tendency to withdraw the pivot from its supporting eye.

From the foregoing, it will be apparent that a line supporting mechanism has been provided which may be used in buildings having enclosed ceilings as well as those in which joists are exposed. The line support may be moved between active and inactive positions and will occupy a minimum of space when in the latter position.

This application is substituted for my prior abandoned application, Serial No. 356,970, filed September 16, 1940.

While the mechanism may be modified by changing the shape and relation of parts, the rights to such modifications as may be said to fall within the scope of the appended claims is hereby reserved.

What is claimed is:

1. Line supporting apparatus comprising spaced opposed sets of supporting members, each of said members being composed of a length of wire bent intermediately of its length to form an eye portion, the latter terminating in a relatively short substantially vertically disposed arm and a longer arm extending in angular relation to the vertical arm, the upper ends of both arms terminating in laterally offset pivoting extensions arranged in relatively spaced axial registration and adapted for pivotal reception in ceiling-mounted supports, whereby said members are pivotally suspended for free swinging movement, tie links uniting the supporting members of each set in spaced relationship and for uniform simultaneous swinging movement, means for retaining said supporting members in elevated inactive positions substantially in parallelism with and adjacent to the supporting ceiling, and hook means carried by the eye portions of said members for securing a flexible line thereto.

2. Clothesline supporting apparatus comprising spaced sets of supporting members suspended for free swinging movement from a rigid horizontal supporting surface, each of said members being formed from a length of resilient wire and being bent intermediately of the length thereof to provide an eye portion, the latter terminating in angularly disposed arms of unequal length, offset axially registering fulcruming extensions formed at the free ends of said arms and receivable within bearing elements carried by said rigid horizontal surface, means uniting the supporting members of each set in relatively spaced relationship and providing for uniform and joint swinging movement of said members, and means for retaining said members in elevated inactive positions wherein said members are disposed substantially in parallelism with said rigid horizontal surface.

3. Clothesline supporting apparatus comprising spaced opposed sets of supporting members, each of said members being composed of a length of resilient wire bent intermediately of its length to form an eye portion, the latter terminating in a relatively short, substantially vertically disposed arm and a second longer arm extending in angular relation to the vertical arm, the upper ends of both arms terminating in laterally offset extensions arranged in relatively spaced axial registration, screw eyes carried by an overhead support and in which said extensions are pivotally received to provide for the free swinging suspension of said supporting members from the overhead support, wire spacing links having eyes formed in the ends thereof for the reception of the longer arms of said supporting members, and line-engaging hooks carried by the eye portions of said supporting members.

4. Line supporting apparatus comprising spaced opposed sets of bracket members, each of said brackets being formed from a length of wire bent to provide an eye portion and a pair of arms projecting therefrom, said arms being angularly related, the free ends of said arms being directed toward one another to provide pivot extensions, and link means connecting said brackets adjacent to the eye portion thereof, said link means providing for simultaneous swinging movement of said brackets about said pivot extensions.

5. In line supporting apparatus, a plurality of brackets each of which is formed from a length of wire bent to provide a V-member having one substantially vertical arm and an inclined arm, aligned pivot extensions provided at the free ends of said arms, the extension on the inclined arm being directed toward the other arm, an eye member provided at the juncture of said arms, and a line-gripping member formed for removable reception by said eye, said member being constructed from a length of wire bent to provide a hook and a loop communicating therewith through a reduced neck.

6. In line supporting apparatus, a plurality of sets of bearing members projecting from the under side of an overhead support, bracket means connected with each set of bearing members for pivotal movement about horizontal axes, each bracket having a substantially V-shaped frame, extension means provided at the upper ends of said frame, said extensions being directed toward one another and positioned in said bearing members, loop means provided on said brackets at the lower ends thereof, link means extending between said brackets and pivotally connected at each end thereto, line-receiving hooks removably positioned in said loops, a brace member extending between the lower end of one of said brackets and the under side of said overhead support, said brace having a pair of sections slidably connected, and a shoulder formed on one of said sections and facing away from said brackets, the engagement of the other section with said shoulder serving to prevent elongation of said brace member and movement of said brackets toward said overhead support, said section being disengageable from said shoulder to permit elongation of said brace whereby said brackets can be moved toward said overhead support.

7. In line supporting apparatus of the type having bracket means suspended from an overhead support and hook-receiving loop means on said brackets, a line receiving hook comprising a section of wire bent to form a hook at one end and an open-sided loop at the other, the ends of said wire section being directed generally toward one another, the end adjacent to said loop being disposed at an angle to the body of the section to provide a V-shaped recess communicating with the loop by a narrow neck.

JOHN A. ROUSCULP.